United States Patent
Strandberg et al.

(10) Patent No.: US 9,970,541 B2
(45) Date of Patent: May 15, 2018

(54) GEAR BOX FOR A WORKING MACHINE AND A METHOD FOR CONTROLLING A GEAR BOX

(71) Applicants: Jonny Strandberg, Eskilstuna (SE); Daniel Stålberg, Eskilstuna (SE); Björn Brattberg, Torshälla (SE)

(72) Inventors: Jonny Strandberg, Eskilstuna (SE); Daniel Stålberg, Eskilstuna (SE); Björn Brattberg, Torshälla (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days. days.

(21) Appl. No.: 14/434,034

(22) PCT Filed: Nov. 20, 2012

(86) PCT No.: PCT/SE2012/000191
§ 371 (c)(1),
(2) Date: Apr. 7, 2015

(87) PCT Pub. No.: WO2014/081352
PCT Pub. Date: May 30, 2014

(65) Prior Publication Data
US 2015/0276055 A1    Oct. 1, 2015

(51) Int. Cl.
*F16H 37/04*    (2006.01)
*F16H 57/04*    (2010.01)
(Continued)

(52) U.S. Cl.
CPC ........... *F16H 61/70* (2013.01); *F16H 37/046* (2013.01); *F16H 57/0412* (2013.01);
(Continued)

(58) Field of Classification Search
CPC .. F16H 37/046; F16H 37/042; F16H 57/0412; F16H 57/0473; F16H 57/0484
See application file for complete search history.

(56) References Cited

U.S. PATENT DOCUMENTS

| | | | |
|---|---|---|---|
| 3,308,686 A | | 3/1967 | Alfred et al. |
| 4,549,443 A | * | 10/1985 | White .................. F16H 3/085 |
| | | | 192/48.601 |

(Continued)

FOREIGN PATENT DOCUMENTS

| | | |
|---|---|---|
| DE | 1113347 B1 | 8/1961 |
| DE | 102010030576 A1 | 12/2011 |

(Continued)

OTHER PUBLICATIONS

European Search Report (dated Jun. 10, 2016) for corresponding European App. EP 12 86 6940.

(Continued)

*Primary Examiner* — Derek D Knight
*Assistant Examiner* — David R Morris
(74) *Attorney, Agent, or Firm* — WRB-IP LLP (57) ABSTRACT

A gear box for a working machine is arranged to be positioned in a first set of speed-changing gears and a second set of speed-changing gears. The gear box includes a gear box housing, an input shaft configured to receive torque, and an output shaft for supplying torque out, from the gear box, wherein the output shaft is connected to a planetary gear set of the gear box, a friction disc clutch arrangement which is arranged between a ring gear of the planetary gear set and the gear box housing for enabling connection of the ring gear to the gear box housing, and a control unit configured to controllably alternate the friction disc clutch arrangement between: an engaged state and an at least partially engaged state when the gear box is positioned in the first set of speed-changing gears, and between a disengaged state and (Continued)

an at least partially engaged state when the gear box is positioned in the second set of speed-changing gears. A corresponding method for controlling a gear box is also provided.

12 Claims, 5 Drawing Sheets

(51) Int. Cl.
*F16H 61/70* (2006.01)
*F16H 3/00* (2006.01)
*F16H 61/00* (2006.01)

(52) U.S. Cl.
CPC ..... *F16H 57/0413* (2013.01); *F16H 57/0473* (2013.01); *F16H 57/0484* (2013.01); *B60Y 2300/18025* (2013.01); *F16H 3/006* (2013.01); *F16H 2061/0037* (2013.01); *F16H 2312/02* (2013.01)

(56) References Cited

U.S. PATENT DOCUMENTS

| | | | |
|---|---|---|---|
| 5,573,471 A * | 11/1996 | Shubinsky | F16H 37/046 475/207 |
| 5,846,153 A | 12/1998 | Matsuoka | |
| 6,217,475 B1 | 4/2001 | Shih | |
| 6,406,400 B1 | 6/2002 | Shih | |
| 7,434,641 B2 * | 10/2008 | Takami | B60K 6/365 180/65.25 |
| 2005/0103544 A1 | 5/2005 | Takami et al. | |
| 2008/0245168 A1 * | 10/2008 | Heinzelmann | F16H 61/04 74/335 |
| 2008/0318730 A1 * | 12/2008 | Endo | B60K 6/365 477/52 |
| 2010/0029433 A1 | 2/2010 | Tenberge | |
| 2013/0005525 A1 * | 1/2013 | Hedman | F16H 3/006 475/218 |

FOREIGN PATENT DOCUMENTS

| | | |
|---|---|---|
| EP | 1883553 B1 | 4/2010 |
| JP | 2004204960 A | 7/2004 |

OTHER PUBLICATIONS

International Search Report (dated Aug. 20, 2013) for corresponding International App. PCT/SE2012/000191.
International Preliminary Report on Patentability dated Nov. 19, 2014) for corresponding International App. PCT/SE2012/000191.

* cited by examiner

GEAR BOX FOR A WORKING MACHINE AND A METHOD FOR CONTROLLING A GEAR BOX

BACKGROUND AND SUMMARY

The present invention relates to a gear box for a working machine, wherein the gear box has a friction disc clutch arrangement between a ring gear of a planetary gear set, connected to an output shaft of the gear box, and a gear box housing, wherein the gear box further comprises a control unit configured to control the friction disc clutch arrangement. The invention also relates to a corresponding method for controlling the gear box. The invention is applicable on working machines within the fields of industrial construction machines, in particular articulated haulers. Although the invention will be described with respect to an articulated hauler, the invention is not restricted to this particular machine, but may also be used in other construction equipment, or in other vehicles, such as a truck or similar.

In connection with transportation of heavy loads, a working machine in the form of an articulated hauler is frequently used. Such working machines may be utilized, for example for transports in connection with road or tunnel building, sand pits, mines, forestry and similar environments. Thus, an articulated hauler is frequently operated with large and heavy loads in rough terrain and on slippery ground where no regular roads are present.

An articulated hauler is a frame-steered working machine having a container for receiving and transporting a load. Such a working machine comprises a front section with a front frame and a first set of wheels, and a rear section with a rear frame and a second set of wheels. A pivot joint is arranged between the front section and the rear section allowing the front section and the section to pivot relative to each other about an axis extending in the vertical direction. Furthermore, the working machine comprises means for steering the working machine by pivoting the front section and the rear section relative to each other about the vertical pivot axis. The steering means normally includes a pair of hydraulic cylinders.

As described above, the articulated hauler is frequently used in rough terrain and as a consequence the different parts of the working machine have to be well dimensioned to be able to work properly in such environment. The gear box is a typical part of the articulated hauler which has to be dimensioned to handle heavy loading in combination with the rough terrain. An important aspect of the gear box is to have a relatively large step in gear ratios for both enabling driving in harsh terrain as well as driving at relatively high speeds on e.g., normal roads.

US 2010/0 029 433 discloses a powershiftable multistage transmission which, by splitting up the gear structure on a plurality of shaft lines, has a small overall length and being adaptable to different series of ratios and ratio steppings. Furthermore, the powershiftable multistage transmission has a brake arrangement in connection to the input shaft which may replace a traditional torque converter of the gearbox.

However, although the brake arrangement may replace a typical torque converter as well as being relatively small in size, the gearbox disclosed in US 2010/0 029 433 is in need of further improvements to be able to work more efficiently in e.g. the above mentioned rough terrain.

It is desirable to provide a gear box having improved functionalities in relation to prior art solutions.

According to a first aspect of the present invention there is provided a gear box for a working, machine, the gear box being arranged to be positioned in a first set of speed-changing gears and a second set of speed-changing gears, wherein the gear box comprises: a gear box housing, an input shaft configured to receive torque, and an output shaft for supplying torque out from the gear box, wherein the output shaft is connected to a planetary gear set of the gear box, a friction disc clutch arrangement which is arranged between a ring gear of the planetary gear set and the gear box housing for enabling connection of the ring gear to the gear box housing, and a control unit configured to controllably alternate the friction disc clutch arrangement between: an engaged state and an at least partially engaged state when the gear box is positioned in the first set of speed-changing gears, and between a disengaged state and an at least partially engaged state when the gear box is positioned in the second set of speed-changing gears.

By providing a gear box having a friction disc clutch arrangement according to the present invention, the need of the separate brake arrangement disclosed in the prior art may be reduced, thereby reducing the need of both as torque convener as well as the brake arrangement in connection to the input shaft. The positioning of the friction disc clutch arrangement may, in comparison to prior art solutions, level out gear changes occurring within the gear box, since the friction disc clutch arrangement is located "after" the gears in the gear box. Moreover, by controlling the friction disc clutch arrangement by means of the control unit, an increasing number of functionalities may be provided for the gear box. According to one advantageous example, when starting the working machine in a steep hill or the like, and the gear box is positioned in one of the speed-changing gears comprised in the first set of speed-changing gears, the control unit may then be configured to alternate the friction disc clutch arrangement between an engaged state and an at least partially engaged state in order to provide more energy to the gear box. Hereby, the friction disc clutch arrangement may be arranged to slip before running at normal gear, i.e. before being fully engaged, thereby providing a more robust behaviour with less risk of engine failure during vehicle start-up. Also, the control unit may be arranged to control the friction disc clutch arrangement such that it can balance torque variations and rotational speed variations in the gear box during operation by controllably providing the friction disc clutch arrangement in the at least partially engaged state, i.e. a slipping state, so that a relatively even and smooth driving characteristic of the gear box may be achieved. As a still further example, the friction disc clutch arrangement may also be used as a brake for the working machine when running the gear box at speeds where the friction disc clutch arrangement is normally positioned in a disengaged state, i.e. the second set of speed-changing gears. Hereby, changing the friction disc clutch arrangement between the disengaged state to the at least partially engaged state, i.e. a slipping state, will decelerate the articulated hauler. Accordingly, the friction disc clutch arrangement, in conjunction with the ordinary wheel brakes, will in such event reduce the speed of the articulated hauler.

Still further, the control unit may also control the friction disc clutch arrangement to be positioned in the at least partially engaged state when changing gear within the first or second sets of speed-changing gears.

Hereby, jerky motions of the gear box may be levelled out by the friction disc clutch arrangement.

The wording "engaged" should in the following and throughout the entire description be interpreted such that the ring gear of the planetary gear set is fixated to the gear box housing. Accordingly, the wording "at least partially engaged" should hence be interpreted such that the friction disc clutch arrangement is in a slipping state, i.e. it is neither fully engaged nor fully disengaged.

According, to an example embodiment, alternation between the first set of speed-changing gears and the second set of speed-changing gears may be controlled by engaging and disengaging the friction disc clutch arrangement, respectively.

Hereby, when running the gear box in the first set of speed-changing gears, the friction disc clutch arrangement is normally positioned in the engaged state. When running the gear box in the second set of speed-changing gears, the friction disc clutch arrangement is normally positioned in the disengaged state. Hence, a clear distinction of the difference between the first and second sets of speed-changing gears is defined for the gear box.

According to an example embodiment, the first set of speed changing gears comprises a plurality of lower speed-changing gears and the second set of speed-changing gears comprises a plurality of higher speed-changing gears, the lower speed-changing gears providing a lower rotational speed ratio of the output shaft in comparison to the higher speed-changing gears.

According to an example embodiment, the control unit may be further configured to acquire an input signal indicative of rotational speed and/or torque of the output shaft at a first point in time and to compare the rotational speed and/or torque at the first point in time with a rotational speed and/or torque of the output shaft at a second point in time, wherein the control unit is further configured to control the friction disc clutch arrangement based on the input signal and the comparison.

Hereby, the control unit may receive input regarding speed and/or torque variations of the output shaft and to control the friction disc clutch arrangement as a response to this input. The friction disc clutch arrangement may hence be controlled in such a way that e.g. torque variations can be levelled out in the gear box.

According to an example embodiment, the control unit may be further configured to alternate the friction disc clutch arrangement between either the engaged state and the at least partially engaged state or between the disengaged state and the at least partially engaged state if a difference in rotational speed and/or torque between the first point in time and the second point in time exceeds a predetermined threshold value.

Hereby, the gear box may be able to run relatively smoothly despite disturbances that might occur during operation since the friction disc clutch arrangement may continuously level out such disturbances by means of a braking- or slipping operation. Accordingly, variations of rotational speed and/or torque over time may also serve as an input for the control unit to determine when to position the friction disc clutch arrangement in an at least partially engaged state. The term "over time" can be a relative short time period, i.e. parts of a second, or a relative large time period, i.e. from a second to a few seconds, and up to several seconds.

According to an example embodiment, the control unit may be further configured to receive an input signal indicative of a temperature of the friction disc clutch arrangement and to controllably initiate supply of coolant to the friction disc clutch arrangement.

An advantage with this example embodiment is that the friction disc clutch arrangement may normally work as a dry clutch arrangement and receive coolant only when necessary. Hence, the friction disc clutch arrangement may work as a semi dry clutch. Accordingly, coolant may be supplied to the friction disc clutch arrangement when it is positioned in an engaged or at least partially engaged state. A temperature sensor or the like may be utilized to determine when coolant is necessary to be supplied.

However, the control unit may estimate the temperature by means of other parameters as well, such as measuring rotational speed of the friction elements in the clutch, estimation of applied pressure over time of the clutch in combination with input regarding the clutch temperature capacity, etc.

According to a second aspect of the present invention, there is provided a method for controlling a gear box, the gear box being arranged to be positioned in a first set of speed-changing gears and a second set of speed-changing gears, the gear box comprising a friction disc clutch arrangement arranged between a gear box housing of the gear box and a ring gear of a planetary gear set of the gear box for enabling connection of the ring gear to the gear box housing, the planetary gear set being coupled to an output shaft of the gear box for supplying torque out from the gear box, the method comprising the steps of acquiring an input signal indicative of an operational condition of the gear box; comparing the input signal with a predetermined set of rules; and alternating the friction disc clutch arrangement between an engaged state and an at least partially engaged state based on the input signal and the predetermined set of rules if the gear box is positioned in the first set of speed-changing gears, and alternating the friction disc clutch arrangement between a disengaged and an at least partially engaged state based on the input signal and the predetermined set of rules if the gear box is positioned in the second set of speed-changing gears.

Effects and features of this second aspect are largely analogous to those described above in relation to the first aspect of the present invention.

The friction disc clutch arrangement is hence configured to be controllably alternated between the engaged state, the at least partially engaged state, and the disengaged state based on a specific driving condition of the gear box. The input signal indicative of an operational condition may hence be interpreted as an input signal to the gear box providing information regarding driving conditions and/or gear box component behaviour. Gear box component behaviour should be interpreted as the behaviour of e.g. the clutches, shafts, gear wheels, etc. of the gear box.

According to an example embodiment, the input signal indicative of the operational condition of the gearbox may comprise information of change over time of rotational speed and/or torque of the output shaft.

Furthermore, the predetermined set of rules may comprise a predetermined threshold value of a difference in rotational speed and/or torque over time, and wherein the method further comprises the step of:

controllably alternating the friction disc clutch arrangement between either the engaged state and the at least partially engaged state or between the disengaged state and the at least partially engaged state if the difference in rotational speed and/or torque over time exceeds the threshold value.

Hereby, erratic behaviour of the articulated hauler may be substantially avoided since the gear box may be able to compensate for such behaviour by positioning the friction disc clutch arrangement in an at least partially engaged state.

According to an example embodiment, the predetermined set of rules may comprise as threshold value of a deceleration of the output shaft, and wherein the method further comprises the step of: positioning the friction disc clutch arrangement in the at least partially engaged state for the second set of speed-changing gears if the deceleration of the output shaft is below the threshold value.

When for example, the working machine is running at speeds where the friction disc clutch arrangement is positioned in a disengaged state and the working machine is starting to brake, the friction disc clutch arrangement may be positioned in the at least partially engaged state in order to further increase the braking efficiency of the working machine.

According to an example embodiment, the gear box is arranged in a working machine, wherein the predetermined set of rules further comprises a threshold value of a speed of the working machine, and wherein the method further comprising the steps of: alternating the friction disc clutch arrangement between the engaged state and the at least partially engaged state for the first set of speed-changing gears if the speed of the working machine is below the threshold value.

An advantage of the example embodiment is that if the speed of the working machine is below a predetermined minimum limit the friction disc clutch arrangement may be arranged to alternate between the engaged state and the least partially engaged state in order to provide a more robust behaviour of the vehicle and to avoid engine failure or erratic behaviour of the vehicle.

Furthermore, the input signal indicative of an operational condition may also comprise information regarding which gear that is currently being used in conjunction with the current speed and loading of the working machine. If, for example, the working machine is standing still and being empty of load, it might be beneficial to start from a stand still at a higher gear. In such a case it can be beneficial to position the friction disc clutch arrangement in an at least partially engaged state until the articulated hauler has reached a certain speed.

According to an example embodiment, the method may further comprise the steps of acquiring an input signal indicative of a temperature of the friction disc clutch arrangement; and supplying coolant to the friction disc clutch arrangement if the temperature is above a predetermined temperature limit.

According to an example embodiment, coolant may be supplied to the friction disc clutch arrangement when the friction disc clutch arrangement is positioned in the engaged state and/or the at least partially engaged state.

Further features of, and advantages with, the present invention will become apparent when studying the appended claims and the following description. The skilled person realize that different features of the present invention may be combined to create embodiments other than those described in the following, without departing from the scope of the present invention. For example, the above description of the different advantages of the present invention is only described in relation to driving the vehicle forward, the various embodiments of the invention are of course also applicable when providing the gear box in one of the reversed gears, i.e. when the working machine is driving backwards.

BRIEF DESCRIPTION OF THE DRAWINGS

The above, as well as additional features and advantages of the present invention, will be better understood through the following, illustrative and non-limiting detailed description of an exemplary embodiment of the present invention, wherein.

DETAILED DESCRIPTION

The present invention will now be described more fully hereinafter with reference to the accompanying drawings, in which an exemplary embodiment of the invention is shown. The invention may, however, be embodied in many different forms and should not be construed as limited to the embodiment set forth herein; rather, this embodiment is provided for thoroughness and completeness. Like reference character refer to like elements throughout the description.

Figure 1:
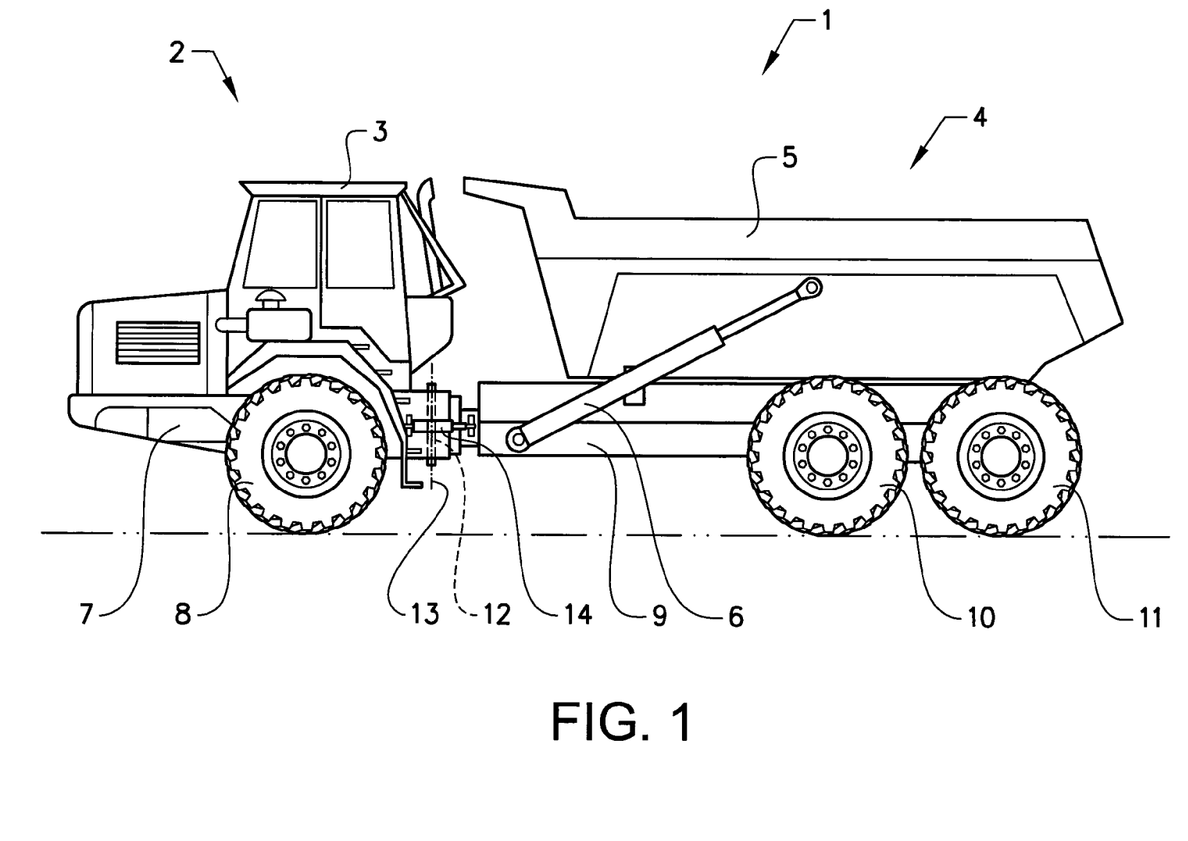
FIG. 1 illustrates a perspective view of an articulated hauler comprising a gear box according to the present invention.

FIG. 1 is an illustration of a working machine 1 in the form of an articulated hauler having a front section 2 with a cab 3 for a driver and a rear section 4 with a container 5 for receiving load. The container is preferably pivotally connected to the rear section and tiltable by means of a pair of tilting cylinders 6, for example hydraulic cylinders. The front section has a front frame 7 and a pair of wheels 8 suspended from the front frame 7. The rear section 4 has a rear frame 9 and two pair of wheels 10, 11 suspended from the rear frame 9.

The working machine is frame-steered, i.e. there is a pivot joint 12 connecting the front section 2 and the rear section 4 of the working machine 1. The front section and the rear section are pivotally connected to each other for pivoting around a substantially vertical pivot axis 13.

The working machine preferably comprises a hydraulic system having two hydraulic cylinders 14, steering cylinders, arranged on opposite sides of the working machine for turning the working machine by means of relative movement of the front section 2 and the rear section 4. The hydraulic cylinders can, however, be replaced by any other linear actuator for steering the machine, such as an electromechanical linear actuator.

The working machine can further comprise a second pivot joint connecting the front section and the rear section of the working machine for allowing the front section and the rear section to pivot relative to each other about a substantially horizontal pivot axis extending in the longitudinal direction of the working machine.

Figure 2:
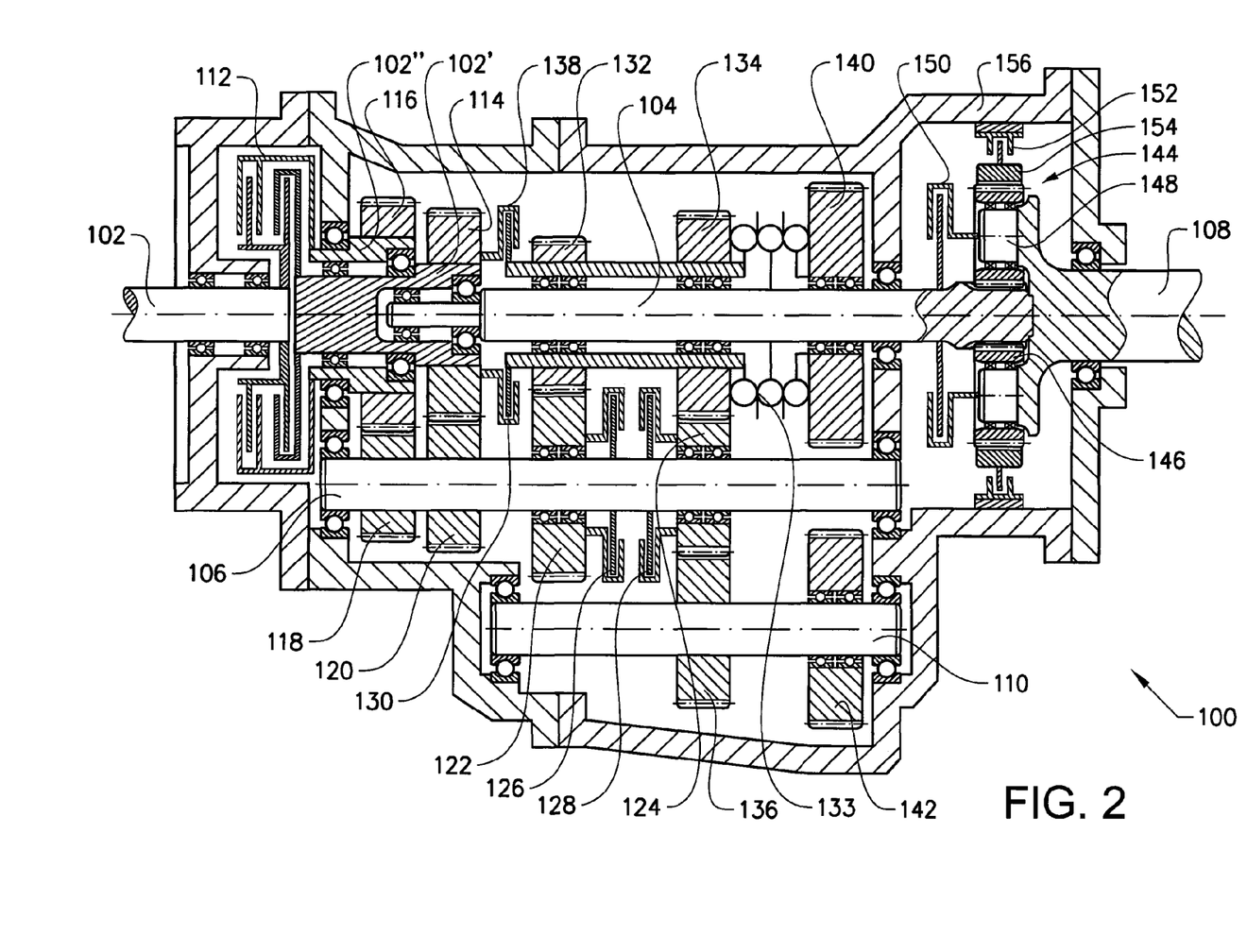
FIG. 2 illustrates a cross sectional side view of a gear box according to an embodiment of the present invention.

In order to be able to run the working machine in various conditions, i.e. different type of terrain, the working machine is in need of a gear box for providing different gear ratios depending on the specific driving condition. Turning to FIG. 2, there is illustrated a cross sectional side view of a gear box 100 according to an example embodiment of the present invention. The depicted gear box 100 illustrated in FIG. 2 comprises an input shaft 102 configured to be connected to an internal combustion engine, or the like, of the articulated hauler for providing torque from the engine in to the gear box 100. The gear box 100 further comprises a main shaft 104, a counter shaft 106, an output shaft 108 and a reverse gear shaft 110. The input shaft 102 is coupled to a clutch unit 112 for controlling torque from the engine to one of an inner input shaft 102' or an outer input shaft 102". The inner 102 and outer 102" input shafts are provided with an inner input gear wheel 14 and an outer input gear wheel 116, respectively. Furthermore, the inner input gear wheel 114 and the outer input gear wheel 116 are each in meshed connection with a first counter shaft gear wheel 118 and a second counter shaft gear wheel 120. Hereby, torque from the engine can be provided from the input shaft 102, via one of the inner 102' and outer 102" input shafts, to the counter shaft 106.

Moreover, the counter shaft 106 further comprises a third 122 and a fourth 124 counter shaft gear wheel which are in meshed connection with a first 132 and a second 134 main shaft gear wheel, respectively. The first main shaft gear wheel 32 is connectable with the inner input shaft 102 via a clutch 130. The second main shaft gear wheel 134 is connectable to the main shaft 104 via a clutch 133. Furthermore, a clutch 126 connects the third counter shaft gear wheel 122 to the counter shaft 106 and a clutch 128 connects the fourth counter shaft gear wheel 124 to the counter shaft 106. Torque is hence allowed to be transferred from the counter shaft 106 to the main shaft 104, via respective clutches 126, 128, 130, 133 and the meshed connection between the gear wheels on the counter shaft 106 and the gear wheels on the main shaft 104. Also, the fourth counter shaft gear wheel 124 is in meshed connection with a reversed gear wheel 136 positioned on the reverse gear shaft 110.

Gear wheel 140 and 142 relates to the reverse gear. The reverse gear is not explicitly described herein but the skilled person readily appreciates that the functions and advantages of the present invention is equally, applicable for the reverse gear as for any of the forward driven gear described herein.

Furthermore, torque from the inner input shaft 102' can also be provided to the main shaft 104 through a clutch 138 arranged between the inner input shaft 102" and the main shaft 104. In this case, the counter shaft 106 is unloaded.

Still further, the main shaft 104 is also connected to the output shaft 108 for supplying torque from the main shaft 104 and out from the gear box 100 to e.g. wheels of the articulated hauler 1. The main shaft 104 is coupled to the output shaft 108 by means of a planetary gear set 144. More specifically, a sun gear 146 of the planetary gear set 144 is coupled to the main shaft 104, while planet carrier 148 of the planetary gear set 144 is coupled to the output shaft 108. A first planetary clutch 150 is configured to couple the main shaft 104 to the planet carrier 148 and a friction disc clutch arrangement 152 is configured to couple a ring gear 154 to a gear box housing 156, wherein the gear box housing 156 is configured to enclose the various parts of the gear box described above. The sun gear 146 can in an example embodiment also be connected to the ring gear 154 by means of the first planetary clutch 150. The friction disc clutch arrangement 152 and its functionalities will be described further below in relation to FIGS. 3a-4.

Moreover, the friction disc clutch arrangement 152 can be either a dry clutch or a wet clutch. The friction disc clutch arrangement may also be used as a semi dry clutch when disengaged and as a wet clutch when engaged.

Hereby, coolant can be controllably provided to the friction disc clutch arrangement 152 when e.g. the temperature of the friction disc clutch arrangement 152 reaches a specific and predetermined temperature limit.

When choosing a desired gear, the various clutches described above are either engaged or disengaged, depending, on the specific gear currently being used. A detailed description for the connection of each one of the different gears will not be given in this application since it is considered to be known by a person skilled in the art how to shift between the different gears in the gear box. However, for better understanding of the inventive concept of the present application, the following will describe the different operational modes in terms of a first set of speed changing gears and a second set of speed changing gears. The first set of speed changing gears provides lower speed, but an increased torque, of the articulated hauler in relation to the second set of speed changing gears.

Figure 3A:
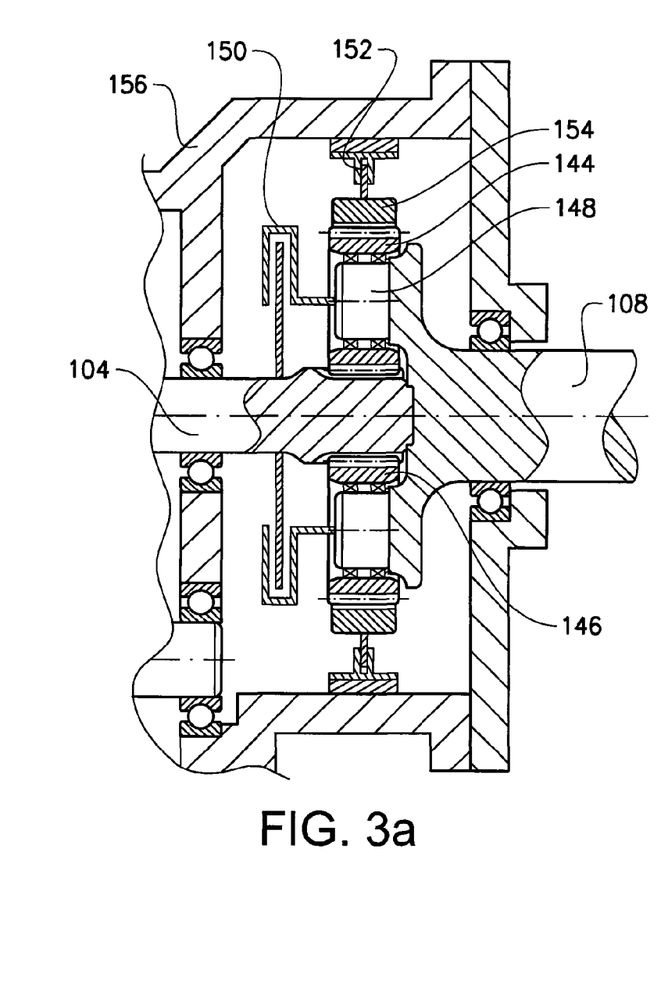
FIGS. 3a-3d illustrates, in detail, respective example embodiments of a friction disc clutch arrangement positioned in the different states according, to the present invention.

Turning to FIG. 3a, there is illustrated an embodiment of the planetary gear set 144 when running the articulated hauler in one of the first speed changing gears. As depicted, the first planetary clutch 150 is in a disengaged state while the friction disc clutch arrangement 152 is in an engaged state, i.e. the ring gear 154 of the planetary gear set 144 is fixated to the gear box housing 156. Hereby, the sun wheel 146 rotates which makes the planet carrier 148 rotate around the sun wheel 146, thereby providing a fixed ratio between the main shaft 104 and the output shaft 108.

Figure 3B:
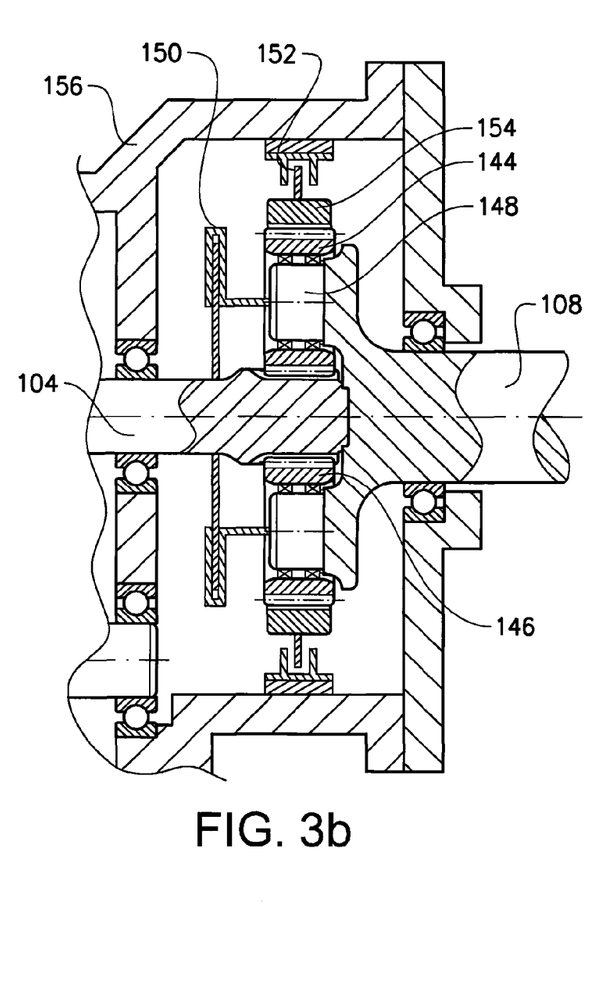

When on the other hand running the articulated hauler in one the second speed changing gears, illustrated in detail in FIG. 3b, the first planetary clutch 150 is in an engaged state while the friction disc clutch arrangement 152 is in a disengaged state, i.e. the ring gear 154 is allowed to rotate in relation to the gear box housing 156. Hereby, the planetary carrier 148 is fixated to the sun wheel 146 as well as to the ring gear 154 of the planetary gear 144, thereby rotating the main shaft 104 and the output shaft 108 at the same rotational speed.

Now, the following detailed description will focus on the friction disc clutch arrangement 152 coupling the ring gear 154 of the planetary gear set 144 to the gear box housing 156. In particular, the various functionalities and functions of the friction disc clutch arrangement 152 will be described.

Figure 3C:
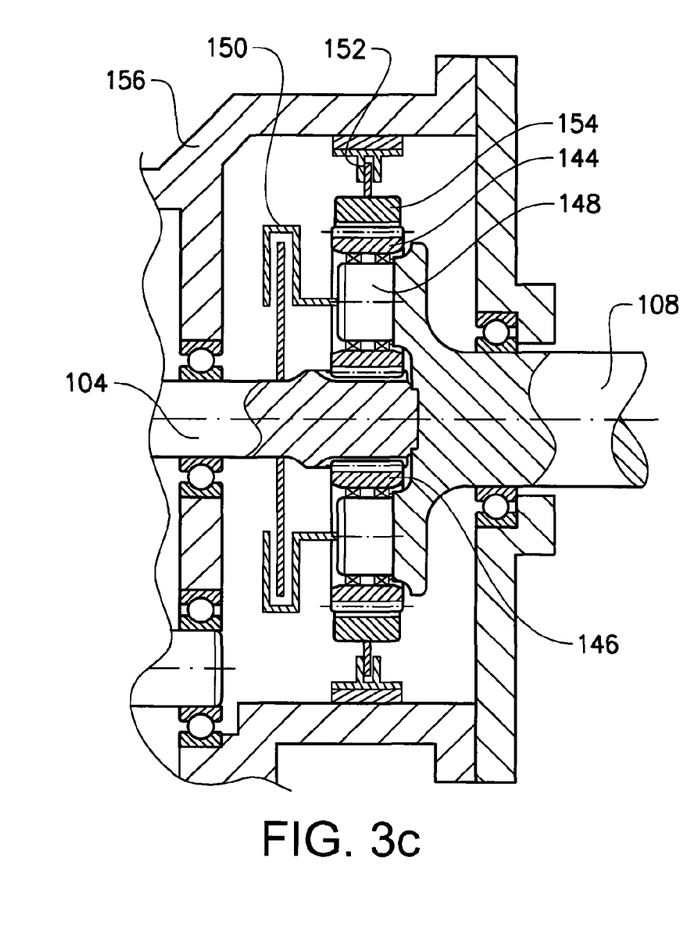

Reference is made to FIG. 3c illustrating a driving scenario of the articulated hauler 1 where the first planetary clutch 150 is in a disengaged state, i.e. the articulated hauler 1 is driving in one of the gears comprised in the first set of speed changing gears as described above. The friction disc clutch arrangement 152 is, as also described, above, in a normal mode of operation positioned in an engaged state. The friction disc clutch arrangement 152 can, however, also be positioned in an at least partially engaged state, which is depicted in FIG. 3c. The at least partially engaged state should be understood such that the friction disc clutch arrangement 152 is slipping, i.e. a relative, but constrained, motion between the ring gear 154 and the gear box housing is allowed. When running the gear box in the set of lower speed changing gears, it can be advantageous to controllably position the friction disc clutch arrangement 152 in the at least partially engaged state. For example, when starting the articulated hauler from a standstill, using one of the gears comprised in the set of lower speed changing gears, slipping the friction disc clutch arrangement 152 can increase the engine power so that the risk of engine failure is reduced. This function can be especially advantageous to use when starting in a steep hill or when the articulated hauler is heavy loaded with e.g. working material or the like.

Furthermore, positioning the friction disc clutch arrangement 152 in the at least partially engaged state can be advantageous in order to, for example, level out torque- or rotational speed variations between e.g. the main shaft 104 and the output shaft 108. Hereby, there may be no need of using a torque convener for these purposes. These torque or rotational speed variations can often occur in a gear box due to e.g. of gear within the first set of speed-changing gears, various engine loads, or generated loads from a power take-off unit (PTO) often used in the gear box. Hereby, irregular behaviour occurring e.g. from the engine and to the main shaft 104 can be levelled out by controllably positioning the friction disc clutch arrangement 152 in an at least partially engaged state. Accordingly, the irregular behaviour may hence not be supplied all the way to the wheels of the vehicle, thereby increasing, driving comfort for the driver and the passengers.

Figure 3D:
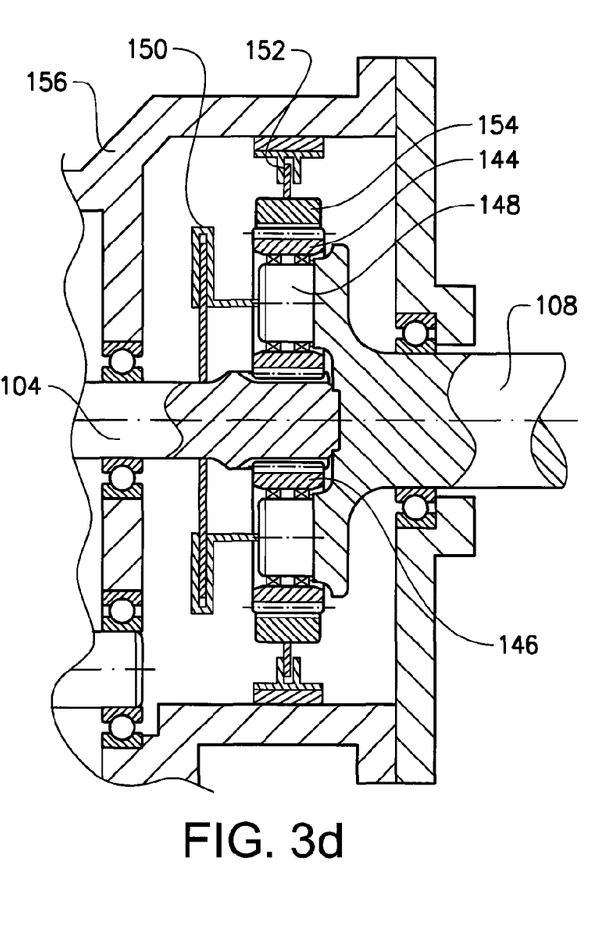

Turning now to FIG. 3d which illustrates a driving scenario of the articulated hauler 1 where the first planetary clutch 150 is in an engaged state, i.e. the articulated hauler 1 is driving in one of the gears comprised in the second set of speed changing gears as described above. The friction disc clutch arrangement 152 is, as also described above, in a normal mode of operation positioned in a disengaged state. Accordingly, when running the articulated hauler 1 in the second set of speed changing gears the friction disc clutch arrangement is normally disengaged. However, by controllably positioning the friction disc clutch arrangement 152 in an at least partially engaged state, i.e. a slipping, state, as illustrated in FIG. 3d, the friction disc clutch arrangement 152 can be utilized as a supplementary brake for the vehicle. Hereby, at least partially engaging the friction disc clutch arrangement will reduce the speed of the output shaft 108, thereby reducing the speed of the vehicle as the main shaft 104 and the output shaft 108 rotates with the same speed in the second set of speed-changing gears. Also, the friction disc clutch arrangement may be controllably alternated between the disengaged state and the at least partially engaged state in order to level out torque- and/or speed variations that may occur when changing gears within the second set of speed-changing gears.

Figure 4:
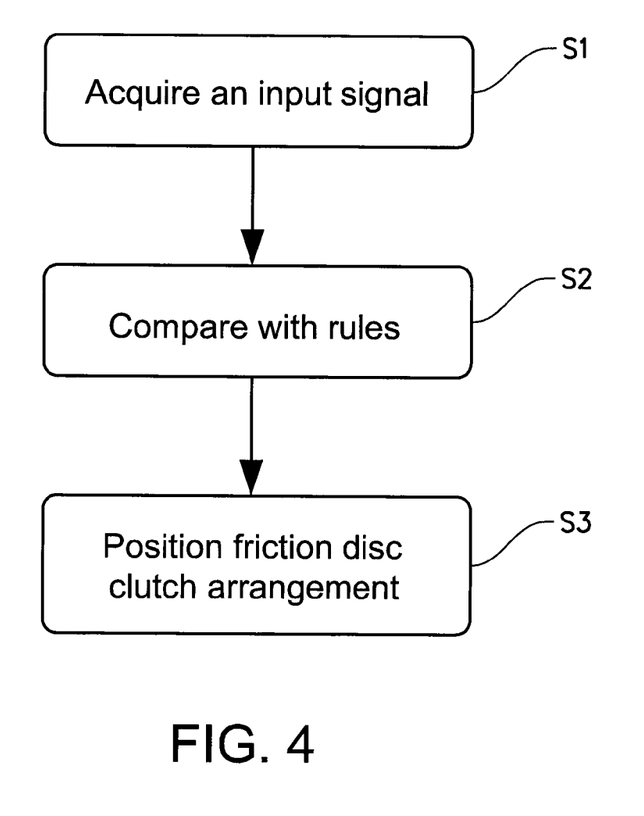
FIG. 4 illustrates an exemplary flow chart of a method for running the gear box illustrated in FIG. 2.

Finally, reference is made to FIG. 4, illustrating an example embodiment of a method for controlling the above described friction disc clutch arrangement 152. When the articulated hauler 1 is driving, or standing still, signals may continuously be provided to a control unit (not shown) or the like of the gear box 100 providing information regarding the condition of the vehicle. Accordingly, the control unit of the gear box 100 acquire S1 an input signal indicative of an operational condition of the gear box 100. The operational condition may, for example, be the above described start-up condition in a steep hill; torque and/or rotational speed variations caused by e.g. gear shifting, engine behaviour, loads from the PTO, etc. Accordingly, the input signal indicative of an operational condition can hence be interpreted as an input signal to the gear box 100 providing, information regarding driving condition of the articulated hauler 1 and/or gear box component behaviour. Thereafter, the control unit compares S2 the input signal with a predetermined set of rules. The predetermined set of rules may, for example, comprise threshold levels regarding the speed of the vehicle, the inclination of the described exemplified steep hill, the level of torque and/or rotational speed variations, braking level required to stop the vehicle at a specific position, etc. Based on the input signal and the predetermined set of rules, the control unit thereafter positions S3 the friction disc clutch arrangement 152 in one of the engaged state, disengaged state, or the at least partially engaged state.

Furthermore, the friction disc clutch arrangement 152 may, as described above, be utilized as a wet friction disc clutch arrangement as well as a dry friction disc clutch arrangement. This can be controlled by the control unit which is hence also configured to controllably provide coolant to the friction disc clutch arrangement when necessary. The friction disc clutch arrangement 152 may hence be operated as a semi dry clutch arrangement. As an example, the control unit may receive an input signal indicative of the temperature in the friction disc clutch arrangement 152. The temperature normally increases when the friction disc clutch arrangement is in one of the above described engaged state or at least partially engaged state. When the temperature reaches a predetermined temperature limit, i.e. a predetermined rule, the control unit is configured to controllably provide coolant to the friction disc clutch arrangement, thereby making, it a wet friction disc clutch arrangement.

Although the invention has been described in relation to a specific type of gear box, the invention should not be construed as limited to exclude other types of gear boxes which may be equally applicable for the present invention. For example, the invention is not limited to the use of a gear box having the above described inner- and outer input shafts, the invention is equally applicable for gear boxes provided with one input shaft for supplying torque to e.g. the counter shaft or the main shaft. Thus, the above description of the example embodiment of the present invention and the accompanying drawings are to be regarded as a non-limiting example of the invention and the scope of protection is defined by the appended claims. Any reference sign in the claims should not be construed as limiting the scope.

The invention claimed is:

1. A gear box for a working machine, the gear box being configurable to provide a first set of speed-changing gears having a first set of gear ratios and a second set of speed-changing gears having a second set of gear ratios, wherein the first set of gear ratios comprises a plurality of lower gear ratios and the second set of gear ratios comprises a plurality of higher gear ratios higher than the first set of gear ratios, comprising:
   a gear box housing,
   an output shaft for supplying torque out from the gear box, wherein the output shaft is connected to a planetary gear set of the gear box, the lower gear ratios providing a higher rotational speed ratio between an input shaft and the output shaft in comparison to the higher gear ratios,
   a friction disc clutch arrangement which is arranged between a ring gear of the planetary gear set and the gear box housing for enabling connection of the ring gear to the gear box housing, the friction disc clutch arrangement being positioned in an engaged state for the first set of speed-changing gears and positioned in a disengaged state for the second set of speed-changing gears, and
   a control unit configured to controllably alternate the friction disc clutch arrangement between:
      the engaged state and an at least partially engaged state when the gear box is configured to provide the first set of gear ratios, and between
      the disengaged state and the at least partially engaged state when the gear box is configured to provide the second set of gear ratios,
   wherein the control unit is further configured to position the friction disc clutch arrangement in the at least partially engaged state when changing gear within at least one of the first set of speed-changing gears and the second set of speed-changing gears.

2. The gear box according to claim 1, wherein engaging and disengaging the friction disc clutch arrangement configures the gear box to provide the first set of gear ratios and the second set of gear ratios respectively.

3. The gear box according to claim 1, wherein the control unit is further configured to acquire an input signal indicative of rotational speed and/or torque of the output shaft at a first point in time and to compare the rotational speed and/or torque at the first point in time with a rotational speed and/or torque of the output shall at a second point in time, wherein the control unit is further configured to control the friction disc clutch arrangement based on the input signal and the comparison.

4. The gear box according to claim 3, wherein the control unit is further configured to alternate the friction disc clutch arrangement between either the engaged state and the at least partially engaged state or between the disengaged state and the at least partially engaged state if a difference in rotational speed and/or torque between the first point in time and the second point in time exceeds a predetermined threshold value.

5. The gear box according to claim 1, wherein the control unit is further configured to receive an input signal indicative of a temperature of the friction disc clutch arrangement and to controllably initiate supply of coolant to the friction disc clutch arrangement.

6. A method for controlling a gearbox, the gear box being configurable to provide a first set of speed-changing gears having a first set of gear ratios and a second set of speed-changing gears having a second set of gear ratios, wherein the first set of gear ratios comprises a plurality of lower gear ratios and the second set of gear ratios comprises a plurality of higher gear ratios, the gear box comprising a friction disc clutch arrangement arranged between a gear box housing of the gear box and a ring gear of a planetary gear set of the gear box for enabling connection of the ring gear to the gear box housing, the friction disc clutch arrangement being positioned in an engaged state for the first set of speed-changing gears and positioned in a disengaged state for the second set of speed-chancing gears, the planetary gear set being coupled to an output shaft of the gear box for supplying torque out from the gear box, the lower gear ratios providing a higher rotational speed ratio between an input shaft and the output shaft in comparison to the higher gear ratios higher than the first set of gear ratios, the method comprising the steps of:
acquiring an input signal indicative of an operational condition of the gear box;
comparing the input signal with a predetermined set of rules; and
alternating the friction disc clutch arrangement between the engaged state and an at least partially engaged state based on the input signal and the predetermined set of rules if the gear box is configured to provide the first set of gear ratios,
alternating the friction disc clutch arrangement between the disengaged state and the at least partially engaged state based on the input signal and the predetermined set of rules if the gear box is configured to provide the second set of gear ratios, and
positioning the friction disc clutch arrangement in the at least partially engaged state when changing gear within at least one of the first set of speed-changing gears and the second set of speed-changing gears.

7. The method according to claim 6, wherein the input signal indicative of the operational condition of the gearbox comprises information of change over time of rotational speed and/or torque of the output shaft.

8. The method according to, claim 7, wherein the predetermined set of rules comprises a predetermined threshold value of a difference in the rotational speed and/or torque over time, and wherein the method further comprising the step of:
controllably alternating the friction disc clutch arrangement between either the engaged state and the at least partially engaged state or between the disengaged state and the at least partially engaged state if the difference in rotational speed and/or torque over time exceeds the threshold value.

9. The method according to claim 6, wherein the predetermined set of rules comprises a threshold value of a deceleration of the output shaft, and wherein the method further comprising the step of:
positioning the friction disc clutch arrangement in the at least partially engaged state for the second set of gear ratios if the deceleration of the output shaft is below the threshold value.

10. The method according to claim 6, wherein the gear box is arranged in a working machine, wherein the predetermined set of rules further comprises a threshold value of a speed of the working machine, and wherein the method further comprises the steps of:
alternating the friction disc clutch arrangement between the engaged state and the at least partially engaged state for the first set of gear ratios if the speed of the working machine is below the threshold value.

11. The method according to claim 6, further comprising the steps of:
acquiring an input signal indicative of a temperature of the friction disc clutch arrangement; and
supplying coolant to the friction disc clutch arrangement if the temperature is above a predetermined temperature limit.

12. The method according to claim 6, wherein coolant is supplied to the friction disc clutch arrangement when the friction disc clutch arrangement is positioned in the engaged state and/or the at least partially engaged state.

* * * * *